US012555191B2

(12) United States Patent
Kikuta et al.

(10) Patent No.: US 12,555,191 B2
(45) Date of Patent: Feb. 17, 2026

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Kyohei Kikuta, Tokyo (JP); Satoshi Ikeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 386 days.

(21) Appl. No.: 18/350,627

(22) Filed: Jul. 11, 2023

(65) Prior Publication Data

US 2024/0020805 A1    Jan. 18, 2024

(30) Foreign Application Priority Data

Jul. 12, 2022 (JP) .................................. 2022-112009
Apr. 27, 2023 (JP) .................................. 2023-073848

(51) Int. Cl.
*G06T 5/30* (2006.01)
*G06F 3/14* (2006.01)
*G06T 5/70* (2024.01)
*G06T 7/13* (2017.01)
*G06V 10/25* (2022.01)

(52) U.S. Cl.
CPC ............... *G06T 5/30* (2013.01); *G06F 3/14* (2013.01); *G06T 5/70* (2024.01); *G06T 7/13* (2017.01); *G06V 10/25* (2022.01)

(58) Field of Classification Search
None
See application file for complete search history.

(56) References Cited

U.S. PATENT DOCUMENTS 7,006,089 B2 *   2/2006   Baumberg .............. G06T 15/20
                                                              345/420

FOREIGN PATENT DOCUMENTS

JP    2012122870 A    6/2012

OTHER PUBLICATIONS

Boxin Shi, et al., A Benchmark Dataset and Evaluation for Non-Lambertian and Uncalibrated Photometric Stereo, IEEE Transaction on Pattern Analysis and Machine Intelligence; vol. 41, No. 2, Feb. 2019.
Kevin H.M. Cheng, et al., Revisiting Outlier Rejection Approach for Non-Lambertian Photometric Stereo, IEEE Transactions on Image Processing, vol. 28, No. 3, Mar. 2019.

(Continued)

*Primary Examiner* — Helen Zong
(74) *Attorney, Agent, or Firm* — Canon U.S.A., Inc. IP Division

(57) ABSTRACT

An image processing apparatus includes an acquisition unit configured to acquire image data obtained by capturing an image of an object to which light is emitted from a plurality of lighting units, a setting unit configured to set a first area with a low reliability for deriving normal information regarding the object in an image represented by the acquired image data, a first derivation unit configured to derive a weight for deriving the normal information regarding the object so that the weight continuously changes between the first area and a second area different from the first area, and a second derivation unit configured to derive the normal information regarding the object based on the derived weight.

11 Claims, 11 Drawing Sheets

(56) References Cited

OTHER PUBLICATIONS

Bo Dong, et al., Scattering Parameters and Surface Normals from Homogeneous Translucent Materials using Photometric Stereo, 2014 IEEE Conference on Computer Vision and Pattern Recognition, IEEE Computer Society, Jun. 2014.

Svetlana Barsky, et al., The 4-Source Photometric Stereo Technique for Three-Dimensional Surfaces in the Presence of Highlights and Shadows, IEEE Transactions on Pattern Analysis and Machine Intelligence; vol. 25, No. 10, Oct. 2003.

\* cited by examiner

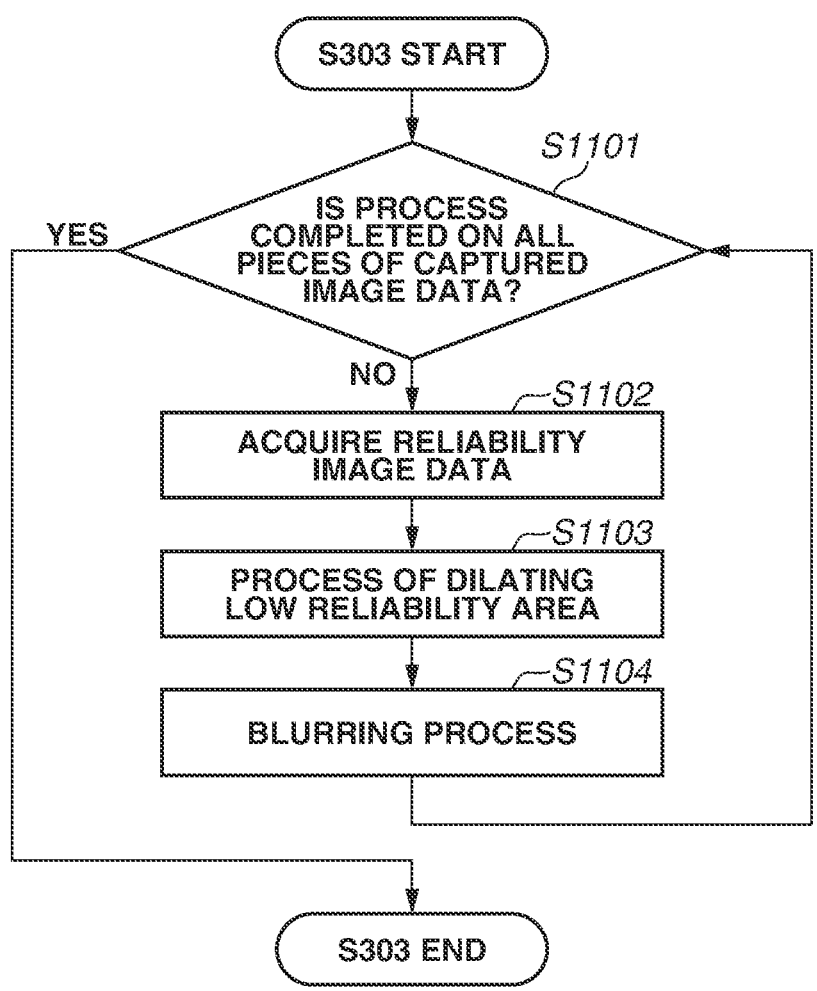

IMAGE PROCESSING APPARATUS, IMAGE PROCESSING METHOD, AND STORAGE MEDIUM

BACKGROUND OF THE DISCLOSURE

Field of the Disclosure

The present disclosure relates to an image processing technique for acquiring information regarding a surface shape of an object.

Description of the Related Art

A technique for deriving a normal to an object by emitting light to the object using multiple lights and capturing an image of the object to which the light is emitted is known. With this technique, normal information (the direction of the surface of the object) is derived by focusing on the angles of the lights and the differences between the amounts of light reflected from the object.

In the technique for deriving the normal to the object, there is a case where a shadow is generated or specularly reflected light unexpectedly appears in a captured image. In this case, the relationships between the angles of the lights and the amounts of light reflected from the object do not correctly appear on the captured image, and it is not possible to derive the normal with high accuracy. Japanese Patent Application Laid-Open No. 2012-122870 discusses a method for narrowing luminance values from a plurality of pieces of captured image data and then calculating a normal vector.

In Japanese Patent Application Laid-Open No. 2012-122870, however, an image used to derive a normal is changed with respect to each pixel according to the narrowing condition. Thus, there is a case where an artifact occurs in output normal information.

SUMMARY OF THE DISCLOSURE

The present disclosure is directed to providing a process for deriving normal information regarding an object with high accuracy even in a case where a shadow or specularly reflected light unexpectedly appears in a captured image.

According to an aspect of the present disclosure, an image processing apparatus includes an acquisition unit configured to acquire image data obtained by capturing an image of an object to which light is emitted from a plurality of lighting units, a setting unit configured to set a first area with a low reliability for deriving normal information regarding the object in an image represented by the acquired image data, a first derivation unit configured to derive a weight for deriving the normal information regarding the object so that the weight continuously changes between the first area and a second area different from the first area, and a second derivation unit configured to derive the normal information regarding the object based on the derived weight.

Further features of the present disclosure will become apparent from the following description of exemplary embodiments with reference to the attached drawings.

BRIEF DESCRIPTION OF THE DRAWINGS

FIG. 11 is a flowchart illustrating a process of deriving a weight.

DESCRIPTION OF THE EMBODIMENTS

Exemplary embodiments of the present disclosure will be described below with reference to the drawings. The following exemplary embodiments do not necessarily limit the present disclosure. Not all the combinations of the features described in the present exemplary embodiments are essential for a method for solving the issues in the present disclosure.

<Hardware Configuration of Image Processing Apparatus>

Figure 1A:
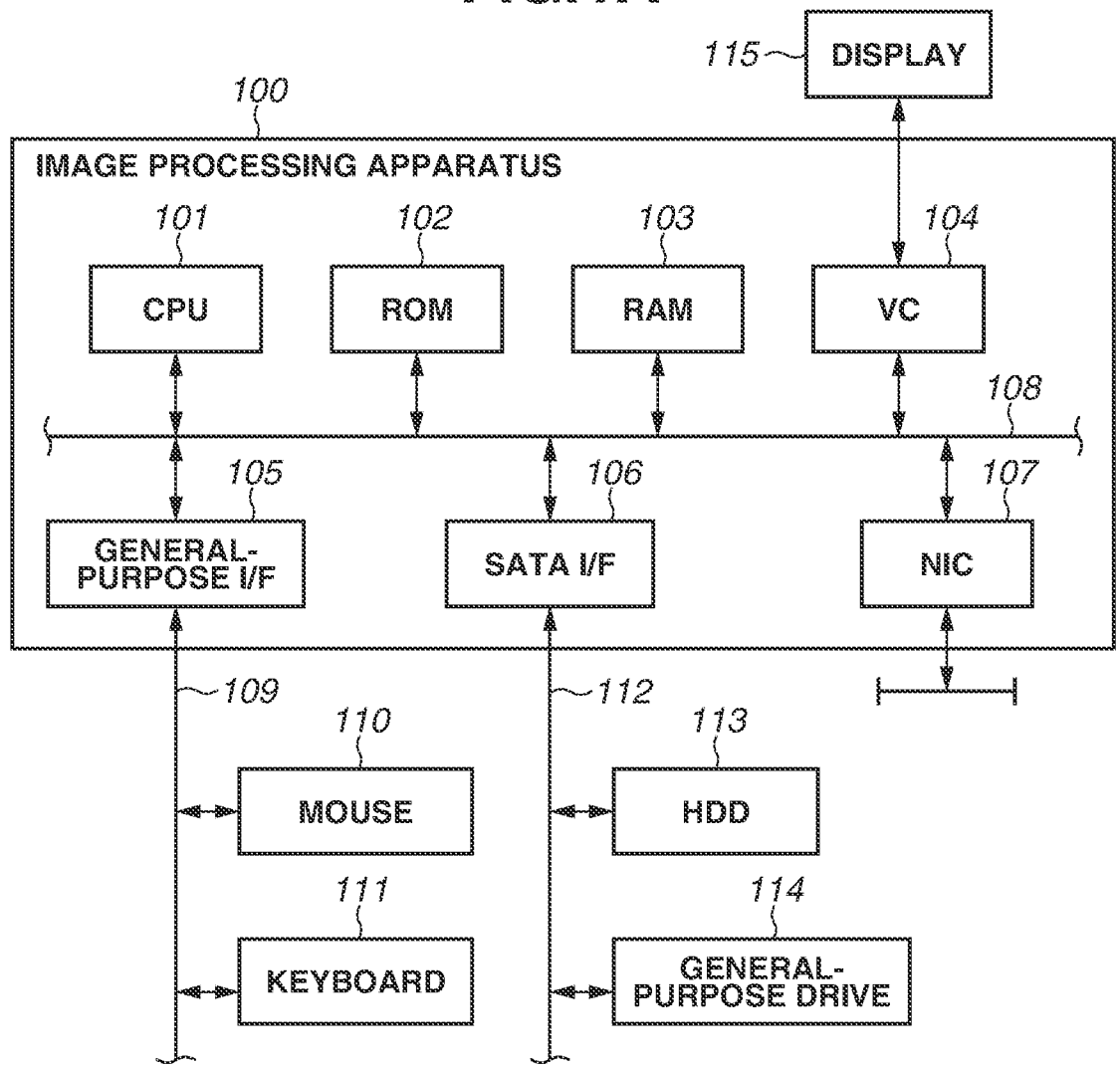
FIGS. 1A and 1B are diagrams illustrating a configuration of an image processing apparatus.

A first exemplary embodiment is to be described. FIG. 1A is a block diagram illustrating a hardware configuration of an image processing apparatus 100. The image processing apparatus 100 includes a central processing unit (CPU) 101, a read-only memory (ROM) 102, and a random-access memory (RAM) 103. The image processing apparatus 100 also includes a video card (VC) 104, a general-purpose interface (I/F) 105, a Serial AT Attachment (SATA) I/F 106, and a network interface card (NIC) 107. The CPU 101 executes an operating system (OS) and various programs stored in the ROM 102 or a hard disk drive (HDD) 113, using the RAM 103 as a work memory. The CPU 101 also controls these components via a system bus 108. Processing in flowcharts to be described below is achieved by the CPU 101 loading a program code stored in the ROM 102 or the HDD 113 into the RAM 103 and executing the program code. A display 115 is connected to the VC 104. To the general-purpose I/F 105, input devices such as a mouse 110 and a keyboard 111 are connected via a serial bus 109. The HDD 113 and a general-purpose drive 114 that reads to and writes from various recording media are connected to the SATA I/F 106 via a serial bus 112. The NIC 107 outputs information to and inputs information from an external apparatus. The CPU 101 uses the HDD 113 and various recording media mounted on the general-purpose drive 114 as the storage locations of various types of data. The CPU 101 displays on the display 115 a graphical user interface (GUI) provided by a program and receives an input such as a user instruction received through the mouse 110 and the keyboard 111. The display 115 may be a touch panel display having the function of a touch panel that detects a position of a touch by an instruction object such as a finger.

<System Configuration>

Figure 2:
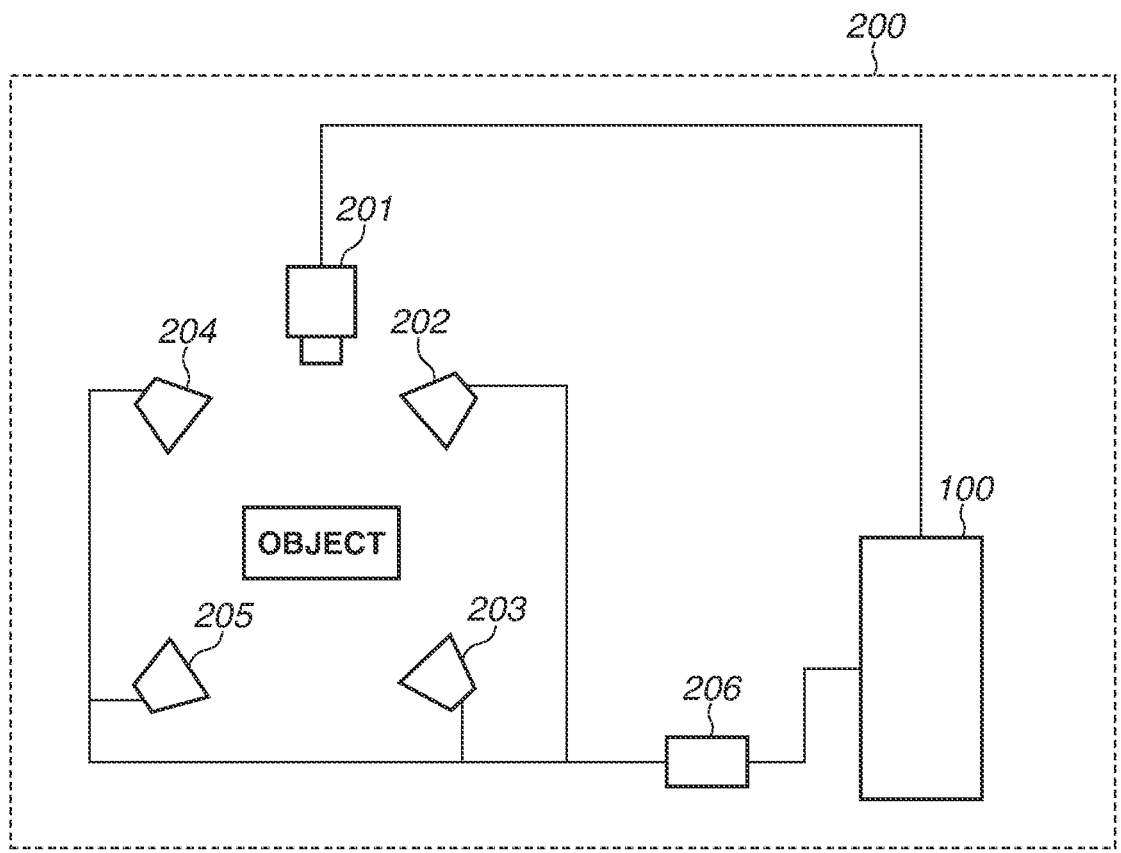
FIG. 2 is a diagram illustrating a configuration of a system.

FIG. 2 is a schematic diagram illustrating a configuration of a system 200 for deriving normal information regarding a target object. The image processing apparatus 100 is connected to an imaging apparatus 201 and a light control apparatus 206. The light control apparatus 206 is connected to a lighting unit 202, a lighting unit 203, a lighting unit 204, and a lighting unit 205. Although four lighting units are used in the present exemplary embodiment, three or five lighting units may be used, and the number of the lighting units is not limited to these examples. An object is placed in the imaging range of the imaging apparatus 201. The plurality of lighting units 202 to 205 emits light to the object. The system 200 can derive normal information by a photometric stereo method.

<Method for Acquiring Captured Image Data>

In the system 200, captured image data about the object is acquired by the following procedure. First, the CPU 101 of the image processing apparatus 100 sequentially individually lights up the lighting units 202 to 205 via the light control apparatus 206, so that light is emitted to the object. In synchronization with the lighting up of the lighting units 202 to 205, the CPU 101 acquires pieces of captured image data about the object from the imaging apparatus 201 and saves the pieces of captured image data in the HDD 113. In a case where the number of the lighting units is M, M pieces of captured image data are acquired. Since M=4 in the present exemplary embodiment, four pieces of image data are acquired. The first piece of image data is image data obtained by lighting up only the lighting unit 202 and capturing an image of the object. Similarly, the second piece of image data is image data obtained by lighting up only the lighting unit 203 and capturing an image of the object. The third piece of image data is image data obtained by lighting up only the lighting unit 204 and capturing an image of the object. The fourth piece of image data is image data obtained by lighting up only the lighting unit 205 and capturing an image of the object.

<Functional Configuration of Image Processing Apparatus>

Figure 1B:
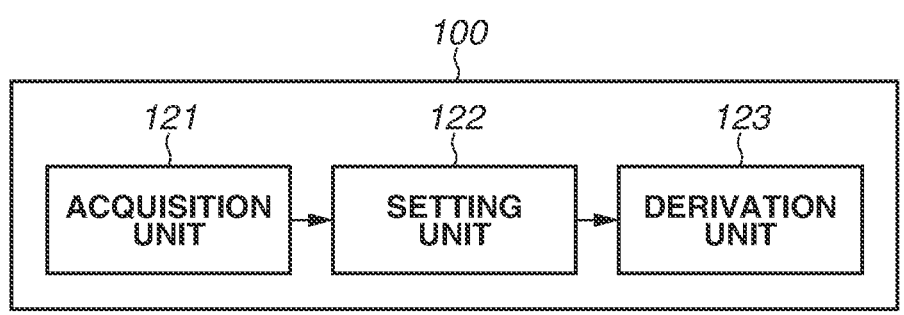

FIG. 1B is a block diagram illustrating a functional configuration of the image processing apparatus 100. The CPU 101 functions as functional components illustrated in FIG. 1B by reading and executing a program stored in the ROM 102 or the HDD 113, using the RAM 103 as a work memory.

Not all the processing illustrated below needs to be executed by the CPU 101. Alternatively, the image processing apparatus 100 may be configured such that part or all of the processing is performed by one or more processing circuits other than the CPU 101.

The image processing apparatus 100 includes an acquisition unit 121, a setting unit 122, and a derivation unit 123. The acquisition unit 121 acquires pieces of captured image data stored in the HDD 113. The acquisition unit 121 may directly acquire the pieces of captured image data from the imaging apparatus 201. The setting unit 122 sets a low reliability area with respect to each of the acquired pieces of captured image data. The derivation unit 123 derives normal information regarding the object, based on the acquired pieces of captured image data and the set low reliability areas.

<Processing Executed by Image Processing Apparatus>

Figure 3:
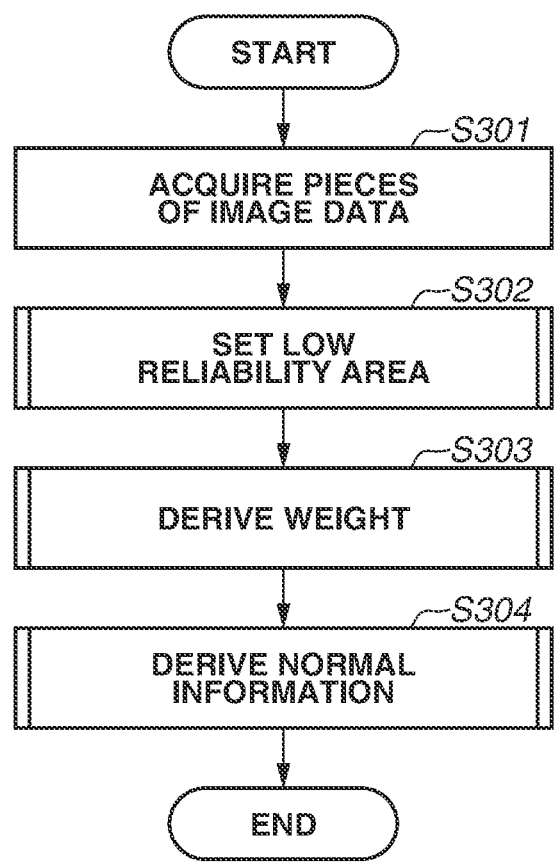
FIG. 3 is a flowchart illustrating processing executed by the image processing apparatus.

In the present exemplary embodiment, with reference to a flowchart in FIG. 3, a series of processes executed by the image processing apparatus 100 is to be described. The processing illustrated in the flowchart in FIG. 3 is started by a user inputting an instruction through the input devices, and the CPU 101 receiving the input instruction. In step S301, the acquisition unit 121 acquires pieces of captured image data stored in the HDD 113. The acquired pieces of captured image data are pieces of image data obtained by capturing images of the object while sequentially lighting up the lighting units 202 to 205. Hereinafter, a luminance value of a captured image represented by each of the acquired pieces of captured image data will be referred to as I(x, y, m). x is an index indicating a pixel position in the horizontal direction of the captured image. y is an index indicating a pixel position in the vertical direction of the captured image. m is an index for identifying the captured image, and $1 \leq m \leq M$. In step S302, the setting unit 122 sets a low reliability area with respect to each of the acquired pieces of captured image data. The details of the process of setting the low reliability area will be described below. In step S303, the derivation unit 123 derives a weight used to derive normal information based on the low reliability area. The details of the process of deriving the weight will be described below. In step S304, the derivation unit 123 derives normal information regarding the object based on the piece of captured image data, the low reliability area, and position information regarding the lighting unit. The details of the process of deriving the normal information will be described below.

<Setting of Low Reliability Area>

In a case where a shadow or specularly reflected light unexpectedly appears in the object, it is difficult to derive the normal information regarding the object with high accuracy. Accordingly, the setting unit 122 according to the present exemplary embodiment detects an area unsuitable for use in deriving the normal, such as an area where a shadow or specularly reflected light unexpectedly appears, in the captured image. Specifically, on the assumption that the object has approximately uniform reflectance, it is determined whether a luminance in the captured image falls within a predetermined range. For example, in a case where the luminance of a certain pixel in the captured image is less than a threshold $Th_1$, it is determined that a shadow unexpectedly appears in an area corresponding to the pixel, and the pixel is set as a pixel included in a low reliability area. In a case where the luminance of a certain pixel in the captured image is greater than a threshold $Th_2$, it is determined that specularly reflected light unexpectedly appears in an area corresponding to the pixel, and the pixel is set as a pixel included in the low reliability area. By this setting process, it is possible to identify an area unsuitable for the derivation of the normal information. This setting process outputs reliability image data representing a reliability image in which a pixel corresponding to the low reliability area has a reliability of 0, and a pixel corresponding to an area other than the low reliability area has a reliability of 1.

Figure 4:
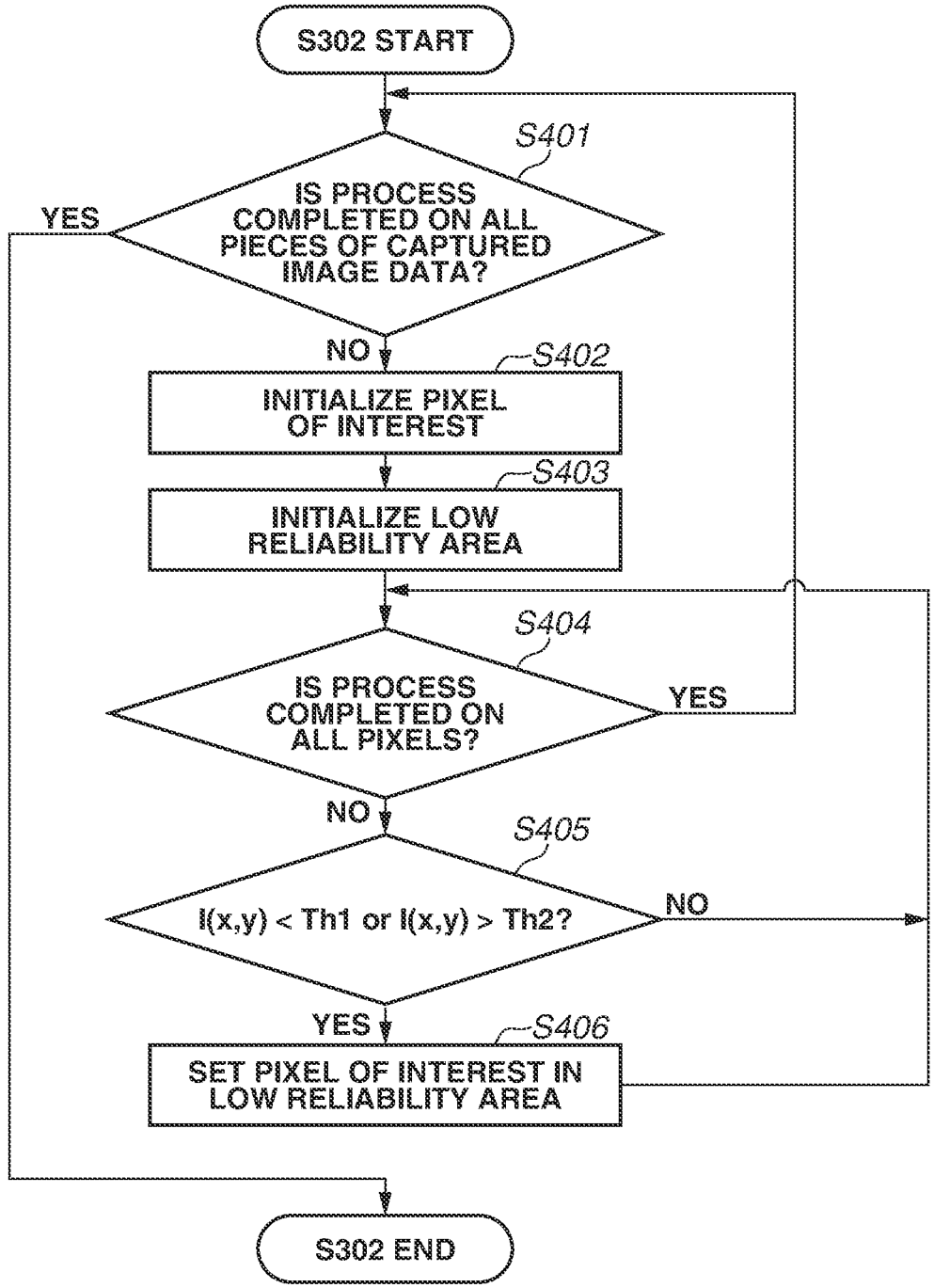
FIG. 4 is a flowchart illustrating a process of setting a low reliability area.

FIG. 4 is a flowchart illustrating a series of processes of setting a low reliability area. In step S401, the setting unit 122 determines whether the process is completed on all the acquired pieces of captured image data. In a case where the process is completed (Yes in step S401), the process of step S302 ends, and the processing proceeds to step S303. If not (No in step S401), the processing proceeds to step S402. In step S402, the setting unit 122 initializes an index (x, y) of a pixel of interest in a captured image to the top left (0, 0) of the captured image.

In step S403, the setting unit 122 initializes a reliability E(x, y, m). Specifically, the setting unit 122 initializes the reliability E(x, y, m) corresponding to each of all the pixels in the captured image to 1. In step S404, the setting unit 122 determines whether the process of determining whether a pixel is included in a low reliability area is completed on all the pixels in the captured image. In a case where the determination process is completed (Yes in step S404), the setting unit 122 increments m, and the processing proceeds to step S401. In a case where the determination process is not completed (No in step S404), the processing proceeds to step S405.

In step S405, the setting unit 122 determines whether the pixel of interest is a pixel in the low reliability area. In a case where either of I(x, y, m)<$Th_1$ or I(x, y, m)>$Th_2$ is satisfied, the setting unit 122 according to the present exemplary embodiment determines that the pixel of interest is a pixel in the low reliability area. In a case where it is determined that the pixel of interest is a pixel in the low reliability area (Yes in step S405), the processing proceeds to step S406. In a case where it is determined that the pixel of interest is not a pixel in the low reliability area (No in step S405), the setting unit 122 increments x or y, and the processing proceeds to step S404. In step S406, the setting unit 122 sets the reliability E(x, y, m) of the pixel of interest to 0. Consequently, the pixel of interest is set in the low reliability area. By the above process of step S302, reliability image data representing a reliability image in which each pixel has a reliability of 0 or 1 is obtained.

Although the low reliability area is determined based on the luminance of the captured image in the present exemplary embodiment, the low reliability area may be determined using color signal values (R, G, B) as pixel values. Alternatively, an area specified through a GUI by the user may be set as the low reliability area.

<Derivation of Weight>

In step S303, in the process of deriving a weight, the derivation unit 123 derives a weight based on the reliability image data. The weight is used to derive the normal. The larger the weight of the pixel is, the higher the degree of contribution of the luminance of the pixel to the derivation of the normal is. In the process of deriving a weight, while a small weight is set for the low reliability area and a large weight is set for an area other than the low reliability area, the weights of the low reliability area and the area other than the low reliability area are smoothly linked together. Consequently, the weight continuously changes between the low reliability area and the area other than the low reliability area. Thus, it is possible to prevent an artifact from occurring in the output normal information.

Figure 5:
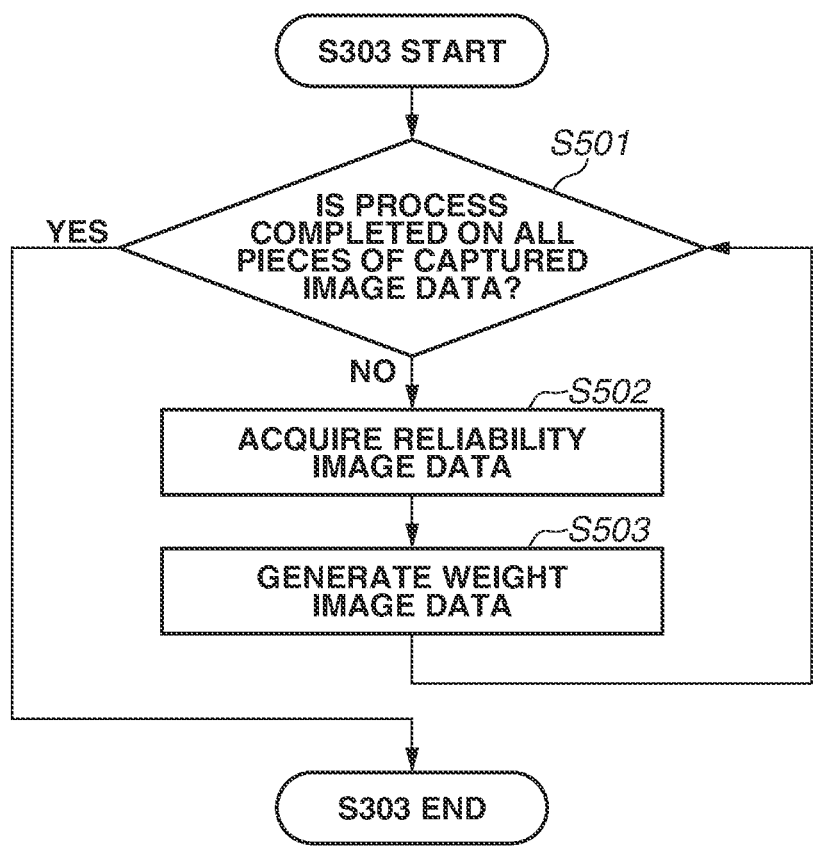
FIG. 5 is a flowchart illustrating a process of deriving a weight.

FIG. 5 is a flowchart illustrating a series of processes of deriving a weight. In step S501, the derivation unit 123 determines whether the process is completed on all the acquired pieces of captured image data. In a case where the process is completed (Yes in step S501), the process of step S303 ends, and the processing proceeds to step S304. In a case where the process is not completed (No in step S501), the processing proceeds to step S502.

In step S502, the derivation unit 123 acquires the reliability image data generated in step S302. The reliability image can be regarded as an image in which a large weight, namely 1, is set for the area where the reliability is high, and a small weight, namely 0, is set for the area where the reliability is low. In step S503, the derivation unit 123 executes a blurring process on the reliability image, thereby generating weight image data representing a weight image. Hereinafter, a weight will be referred to as w(x, y, m). The weight w(x, y, m) is derived using the following formula (1).

$$w(x, y, m) = \sum_{h=-l}^{h=l} \sum_{w=-k}^{w=k} K(h, w) * E(x+h, y+w, m) \quad \text{formula (1)}$$

In the above formula, l and k indicate the kernel size, and l=k=5 in the present exemplary embodiment. K is the kernel of convolution calculation, and an average value filter is used in the present exemplary embodiment. Specifically, K(h, w)=1/(l×k)=1/25. The filter kernel K is not limited to the average value filter, and for example, a Gaussian filter may be used. In a case where the process of step S503 is completed, the derivation unit 123 increments m, and the processing proceeds to step S501.

<Derivation of Normal Information>

Figure 6:
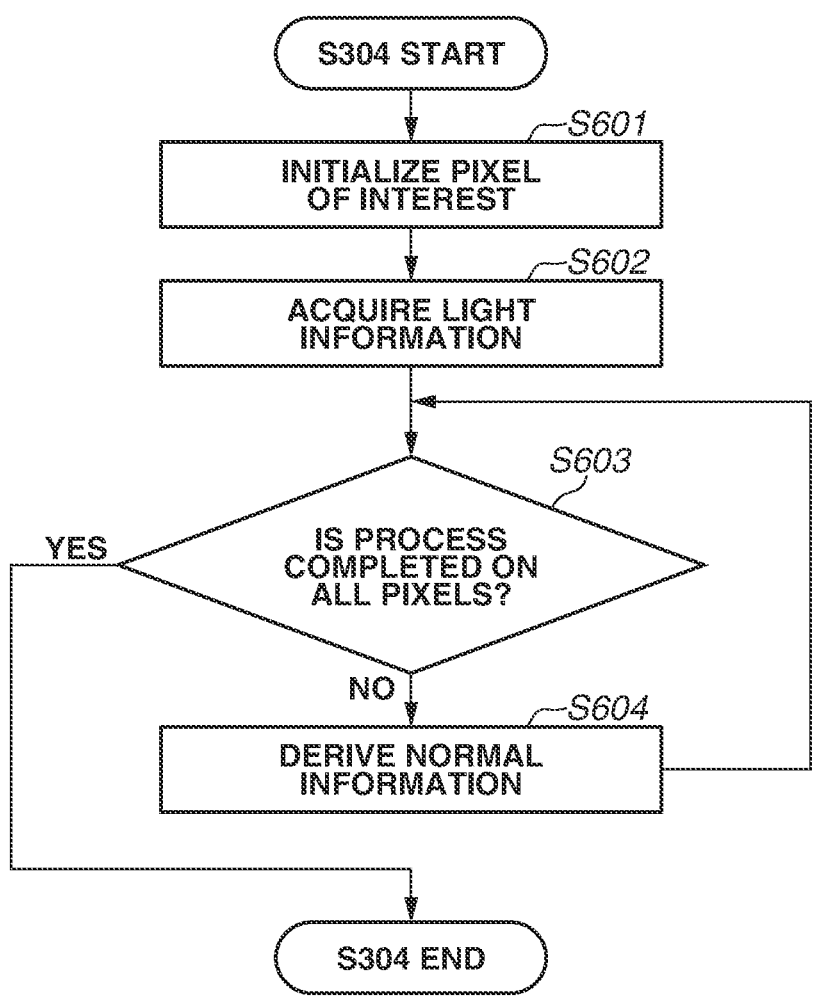
FIG. 6 is a flowchart illustrating a process of deriving normal information.

FIG. 6 is a flowchart illustrating a series of processes of deriving the normal information. In step S601, the derivation unit 123 initializes the index (x, y) of the pixel of interest in the captured image to the top left (0, 0) of the captured image.

In step S602, the derivation unit 123 acquires light information L stored in the HDD 113. The light information L represents a matrix that stores N light vectors when viewed from the object.

Specifically, the light information L is represented by formula (2).

$$L = \begin{pmatrix} l_{1x} & l_{1y} & l_{1z} \\ \vdots & \vdots & \vdots \\ l_{mx} & l_{my} & l_{mz} \end{pmatrix} \quad \text{formula (2)}$$

In the above formula, ($l_{mx}$, $l_{my}$, $l_{mz}$) represents an m-th light vector. It is assumed that the object has Lambertian reflectance properties. In a case where a normal vector at a position (x, y) of the object is n=($n_x$, $n_y$, $n_z$), an estimated value $I_{est}$ of the luminance is represented by formula (3).

$$I_{est} = L\vec{n} \quad \text{formula (3)}$$

In the above formula, $I_{est}$ is a vector having a length M. An m-th element $I_{est}[m]$ is the estimated value of the luminance I(x, y, m) of an m-th captured image at the position (x, y).

In step S603, the derivation unit 123 determines whether the process of deriving the normal information is completed on all the pixels in the captured image. In a case where the derivation process is completed (Yes in step S603), the process of step S304 ends. In a case where the derivation process is not completed (No in step S603), the processing proceeds to step S604. In step S604, the derivation unit 123 derives the normal vector n to minimize the weighted sum of squares of the estimated value $I_{est}$ of the luminance and the luminance value of the captured image. An error E for minimizing the weighted sum of squares is represented by the following formula (4).

$$E = (I_{obs} - L\vec{n})^T W (I_{obs} - L\vec{n}) \quad \text{formula (4)}$$

In the above formula, $I_{obs}$ is a luminance observed at the position (x, y) and is represented by formula (5).

$$I_{obs} = \begin{pmatrix} I(x, y, 1) \\ \vdots \\ I(x, y, N) \end{pmatrix} \quad \text{formula (5)}$$

W represents the weight of each luminance at the position (x, y) and is a diagonal matrix having w(x, y, m) as diagonal components. Specifically, W is represented by formula (6).

$$W = \begin{pmatrix} w(x, y, 1) & \cdots & 0 \\ \vdots & \ddots & \vdots \\ 0 & \cdots & w(x, y, N) \end{pmatrix} \quad \text{formula (6)}$$

The derivation unit 123 estimates the least-squares error taking the weight W into account and thereby can lower the degree of contribution of a luminance unreliable due to the influence of a shadow and also derive the normal vector n. In a case where the least-squares solution is taken by differentiating formula (4), this can be represented by formula (7).

$$\vec{n} = (L^T W L)^{-1} L^T W I_{obs} \quad \text{formula (7)}$$

The derivation unit 123 can derive the normal vector n at the position (x, y) by performing calculation using formula (7).

<Effects of First Exemplary Embodiment>

As described above, the image processing apparatus according to the present exemplary embodiment sets a low reliability area with respect to each captured image and sets a weight according to the low reliability area. Further, the image processing apparatus applies a blur filter to a reliability image, thereby spatially smoothly linking the weights of the low reliability area and an area other than the low reliability area. The blur filter is applied, whereby it is possible to derive spatially smooth weights even in a case where pixel values sharply change between an area where a shadow or specularly reflected light unexpectedly appears and another area. Normal information is derived based on the derived weights, whereby it is possible to derive the normal information with high accuracy even in a case where an object in which a shadow or the specularly reflected light unexpectedly appears is a target.

A second exemplary embodiment is to be described. In the first exemplary embodiment, an area where a shadow or specularly reflected light unexpectedly appears is identified, and a small weight is assigned to the area, thereby deriving normal information robust against the unexpected appearance of the shadow or the specularly reflected light. In a case where an object includes a plurality of areas (e.g., components) different in properties from each other, it is desirable not to blur a weight at the boundary between the areas. Accordingly, in the present exemplary embodiment, an edge detection process is performed on a captured image, thereby identifying the boundary between areas and applying a blur filter only in a case where the unexpected appearance of a shadow or specularly reflected light does not cross the boundary between the areas. The hardware configuration and the functional configuration of an image processing apparatus according to the present exemplary embodiment are equivalent to those according to the first exemplary embodiment, and therefore are not described. The differences between the present exemplary embodiment and the first exemplary embodiment are mainly described below. Components similar to those of the first exemplary embodiment are designated by the same signs in the description.

<Derivation of Weight>

Figure 7:
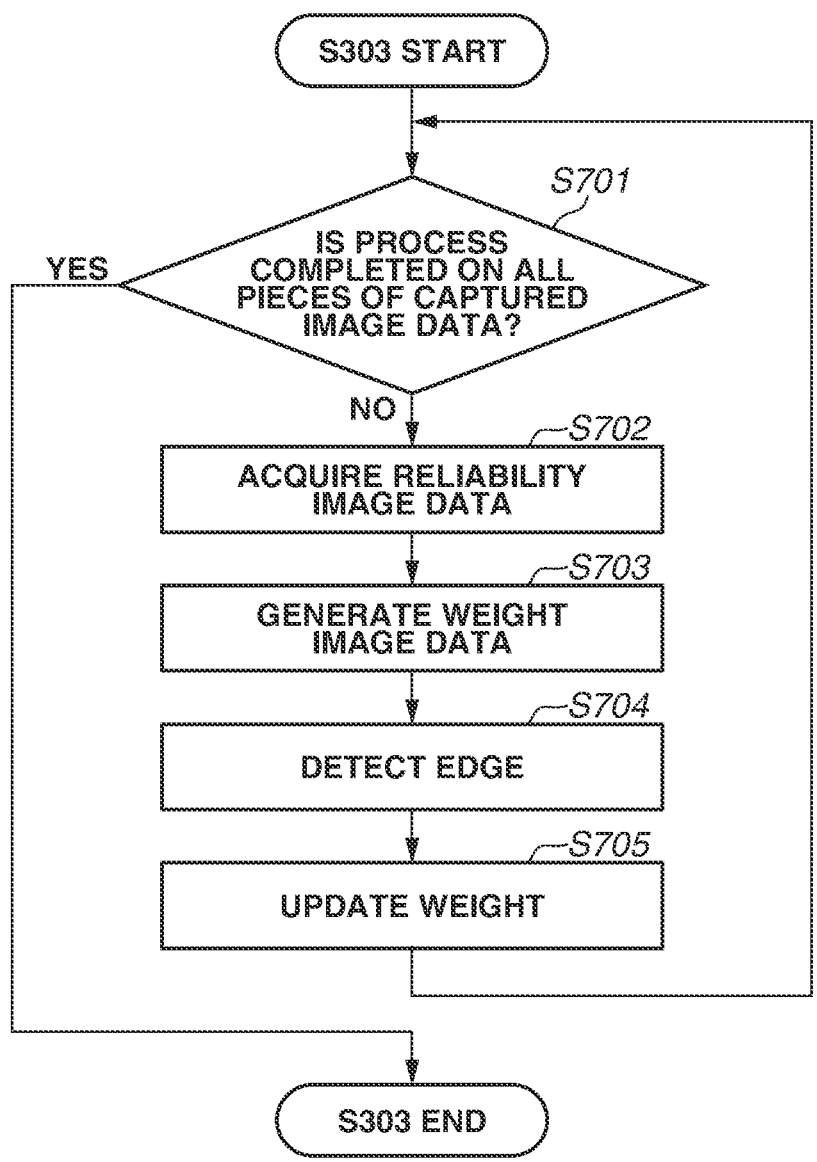
FIG. 7 is a flowchart illustrating a process of deriving a weight.

In the process of deriving a weight according to the present exemplary embodiment, unlike the first exemplary embodiment, an edge is detected in a captured image, and only if the detected edge and a low reliability area do not overlap each other, a blur filter is applied to a weight. FIG. 7 is a flowchart illustrating a series of processes of deriving a weight. In step S701, the derivation unit 123 determines whether the process is completed on all the acquired pieces of captured image data. In a case where the process is completed (Yes in step S701), the process of step S303 ends, and the processing proceeds to step S304. In a case where the process is not completed (No in step S701), the processing proceeds to step S702.

In step S702, the derivation unit 123 acquires the reliability image data. In step S703, the derivation unit 123 executes a blurring process on the reliability image, thereby generating weight image data representing a weight image.

The process of step S703 is similar to the process of step S503 in the first exemplary embodiment. In step S704, the derivation unit 123 executes an edge detection process on the captured image. The derivation unit 123 according to the present exemplary embodiment detects an edge using a known Canny method. Alternatively, for example, the derivation unit 123 may detect an edge by applying a Sobel filter and then performing a threshold process. By the edge detection process, an edge detection result B(x, y, m) is obtained. The edge detection result B(x, y, m) is B(x, y, m)=1 in an edge area and B(x, y, m)=0 in an area other than the edge area.

In step S705, the derivation unit 123 updates the weight w using the edge detection result B(x, y, m). Specifically, the derivation unit 123 performs on the weight image the process of replacing w(x, y, m) in the area where the edge is detected with E(x, y, m). That is, the weight of the edge detection area is replaced with the weight before the blur filter process. Specifically, the weight is represented by formula (8).

$$w(x, y, m) = \begin{cases} w(x, y, m) & \text{if } B(x, y, m) = 0 \\ E(x, y, m) & \text{if } B(x, y, m) = 1 \end{cases} \quad \text{formula (8)}$$

In a case where the process is completed, the derivation unit 123 increments m, and the processing proceeds to step S701.

<Effects of Second Exemplary Embodiment>

As described above, the image processing apparatus according to the present exemplary embodiment determines whether to blur the weight of a low reliability area based on the presence or absence of an edge. In a flat area without an edge, the weights of the low reliability area and an area other than the low reliability area are smoothly linked together, whereby it is possible to prevent an artifact from occurring in normal information. On the other hand, in an edge area, the weights of the low reliability area and the area other than the low reliability area are sharply switched, whereby it is possible to prevent a normal near the edge from blurring.

A third exemplary embodiment is to be described. In the first exemplary embodiment, the weight of an area unsuitable for the derivation of the normal is set to a low value such as 0, and the normal is derived. On the other hand, in the algorithm represented by formula (7), in a case where the number of effective lighting units is small, it is difficult to derive the normal. Accordingly, in the present exemplary embodiment, the weight w is set so that the number of non-zero elements of the weight w at each pixel position is three or more. The hardware configuration and the functional configuration of an image processing apparatus according to the present exemplary embodiment are equivalent to those according to the first exemplary embodiment, and therefore are not described. The differences between the present exemplary embodiment and the first exemplary embodiment are mainly described below. Components similar to those of the first exemplary embodiment are designated by the same signs in the description.

<Derivation of Weight>

Figure 8:
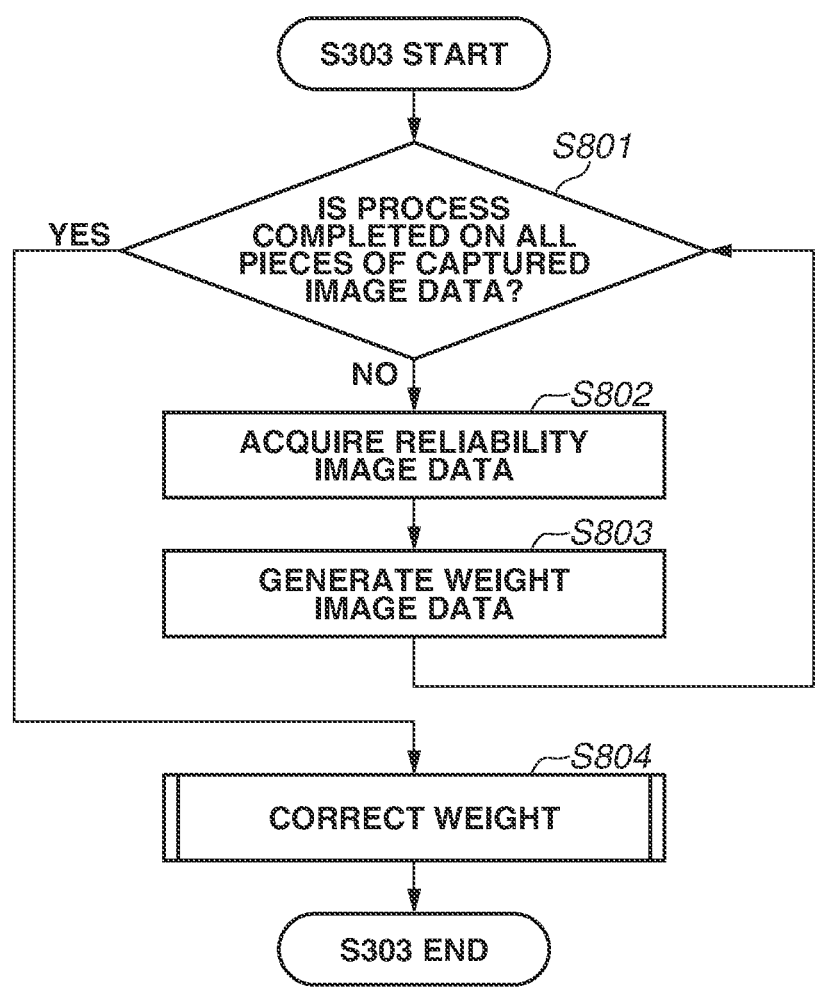
FIG. 8 is a flowchart illustrating a process of deriving a weight.

In the process of deriving a weight according to the present exemplary embodiment, unlike the first exemplary embodiment, in a case where the number of non-zero elements of the weight w at each pixel position is less than three, the weight w is corrected so that the number of non-zero elements of the weight w is three or more. FIG. 8 is a flowchart illustrating a series of processes of deriving a weight. In step S801, the derivation unit 123 determines whether the process is completed on all the acquired pieces of captured image data. In a case where the process is completed (Yes in step S801), the process of step S303 ends, and the processing proceeds to step S304. In a case where the process is not completed (No in step S801), the processing proceeds to step S802.

In step S802, the derivation unit 123 acquires the reliability image data. In step S803, the derivation unit 123 executes a blurring process on the reliability image, thereby generating weight image data representing a weight image. The process of step S803 is similar to the process of step S503 in the first exemplary embodiment. In a case where the process of step S803 is completed, the derivation unit 123 increments m, and the processing proceeds to step S801. In step S804, the derivation unit 123 corrects the derived weight w(x, y, m).

Figure 9:
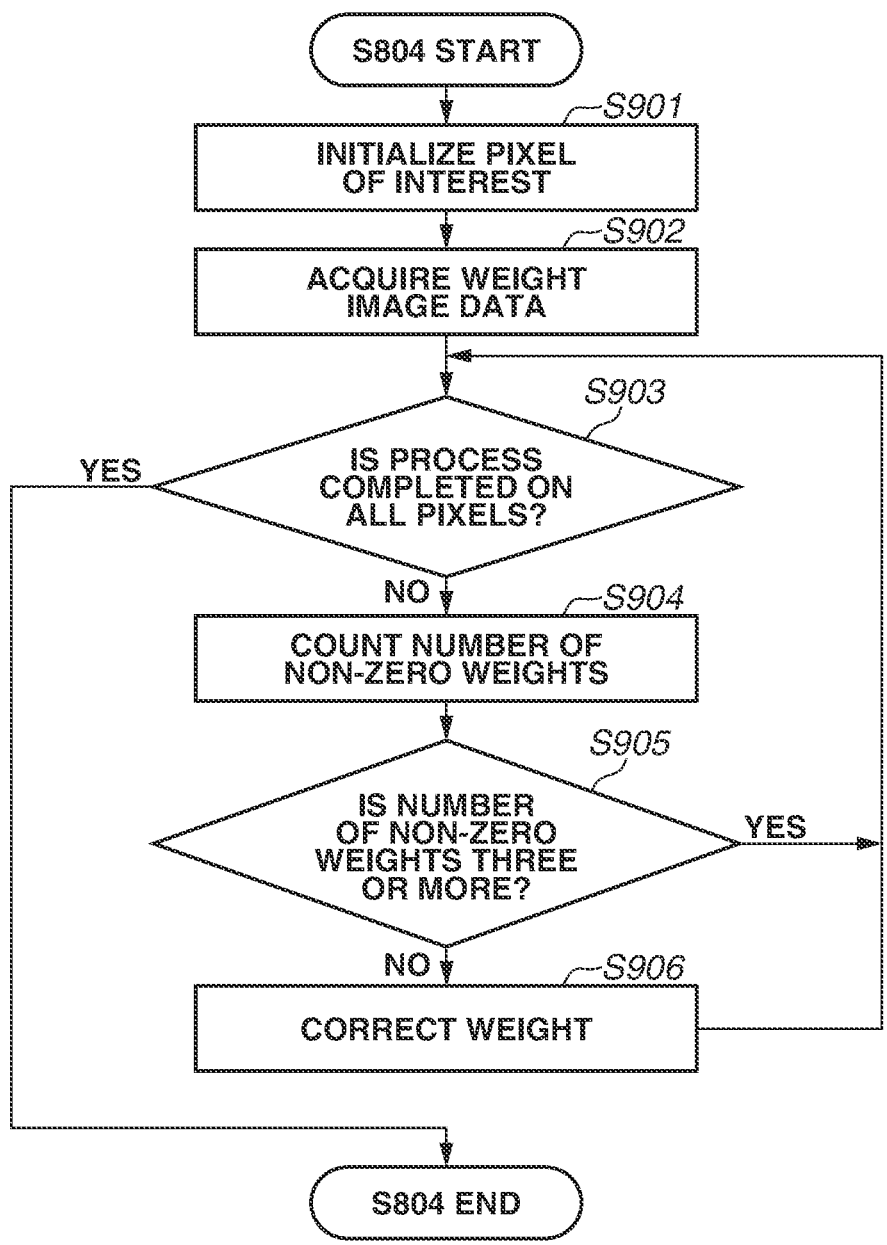
FIG. 9 is a flowchart illustrating a process of correcting the weight.

FIG. 9 is a flowchart illustrating a series of processes of correcting the weight. In step S901, the derivation unit 123 initializes the index (x, y) of the pixel of interest in the captured image to the top left (0, 0) of the captured image. In step S902, the derivation unit 123 acquires the weight image data. In step S903, the derivation unit 123 determines whether the process is completed on all the acquired pieces of captured image data. In a case where the process is completed (Yes in step S903), the process of step S303 ends, and the processing proceeds to step S304. In a case where the process is not completed (No in step S903), the processing proceeds to step S904.

In step S904, the derivation unit 123 counts the number of non-zero elements of the weight w(x, y, m) at the position (x, y). In step S905, the derivation unit 123 determines whether the counted number of non-zero elements is three or more. In a case where the counted number of non-zero elements is three or more (Yes in step S904), the derivation unit 123 increments x or y, and the processing proceeds to step S903. In a case where the counted number of non-zero elements is not three or more (No in step S904), the processing proceeds to step S906.

In step S906, the derivation unit 123 corrects the value of the weight w(x, y, m) at the position (x, y). In the present exemplary embodiment, all the elements of the weight w(x, y, m) at the position (x, y) are set to 1. Alternatively, an element may be randomly selected and the weight of the selected element may be set to 1, or the weight of the element closest to the area other than the low reliability area may be set to 1, so that the number of non-zero element is three or more.

<Effects of Third Exemplary Embodiment>

As described above, in a case where the number of non-zero elements of the weight is less than three, the image processing apparatus according to the present exemplary embodiment corrects the weight so that the number of non-zero elements is three or more. Consequently, also in a case where the number of effective lights is less than three, it is possible to derive the normal information.

A fourth exemplary embodiment is to be described. In the first exemplary embodiment, a blur filter is applied to a reliability image generated based on the determination result of a low reliability area in a captured image, thereby smoothly linking the weights of the low reliability area and an area other than the low reliability area. In a case where the processing according to the first exemplary embodiment is performed, the application of the blur filter may make the value of the weight of a partial area in the low reliability area greater than that before the application of the blur filter. Particularly, the value of the weight of an end portion of the low reliability area increases. Consequently, information regarding the low reliability area may be used to derive the normal with a weight greater than or equal to the setting. Accordingly, in the present exemplary embodiment, while the weight set for a low reliability area is maintained, the weights of the low reliability area and an area other than the low reliability area are smoothly linked together. The hardware configuration and the functional configuration of an image processing apparatus according to the present exemplary embodiment are equivalent to those according to the first exemplary embodiment, and therefore are not described. The differences between the present exemplary embodiment and the first exemplary embodiment are mainly described below. Components similar to those of the first exemplary embodiment are designated by the same signs in the description.

<Derivation of Weight>

In the process of deriving a weight according to the present exemplary embodiment, while the weight set for a low reliability area is maintained, the weights of the low reliability area and an area other than the low reliability area are spatially smoothly linked together. FIG. 11 is a flowchart illustrating a series of processes of deriving a weight.

In step S1101, the derivation unit 123 determines whether the process is completed on all the acquired pieces of captured image data. In a case where the process is completed (Yes in step S1101), the process of step S303 ends, and the processing proceeds to step S304. In a case where the process is not completed (No in step S1101), the processing proceeds to step S1102. In step S1102, the derivation unit 123 acquires the reliability image data generated in step S302. The processes of steps S1101 and S1102 are similar to those of steps S501 and S502.

In step S1103, the derivation unit 123 performs an erosion process on the reliability image. The reliability image is an image in which a large weight, namely 1, is set for the area where the reliability is high, and a small weight, namely 0, is set for the area where the reliability is low. The erosion process is performed by applying the kernel of a predetermined erosion process to all the pixels in the image. The value of a pixel of interest at the center of the kernel is the minimum value of the pixels in the kernel. Consequently, the area where the reliability is high (the area where the pixel value is 1) erodes, and the area where the reliability is low (the area where the pixel value is 0) dilates. In the present exemplary embodiment, the kernel size of the erosion process is the same as the kernel size of a blurring process in step S1104.

In step S1104, the derivation unit 123 executes a blurring process on the reliability image subjected to the erosion process and obtained in step S1103. The derivation unit 123 acquires weight image data. The process of step S1104 is similar to that of step S503.

<Effects of Fourth Exemplary Embodiment>

As described above, the image processing apparatus according to the present exemplary embodiment dilates a low reliability area by performing an erosion process on a reliability image before a blurring process. Consequently, when the kernel of the blurring process is applied to an end of the low reliability area before the erosion process, the pixel value in the kernel is 0, and therefore, an increase in the weight is prevented. If, however, the dilation of the low reliability area is too great, it is not possible to utilize information regarding the area where the reliability is not low. In the present exemplary embodiment, the kernel size of the erosion process is the same as the kernel size of the blurring process, whereby it is possible to prevent an increase in the weight of the low reliability area and also use information regarding an area outside and other than the low reliability area as much as possible.

Also by a method other than the above, it is possible to maintain the weight set for a low reliability area. For example, the degree of erosion of the erosion process may be controlled based on the number of times the erosion process is performed, instead of the kernel size. Alternatively, in step S503 in the first exemplary embodiment, the low reliability area may be masked so that the value of the low reliability area does not change. Yet alternatively, after step S503 in the first exemplary embodiment, the value of the original low reliability area may be changed back to 0.

In the reliability image according to each of the above exemplary embodiments, the area where the reliability is high is the area where the pixel value is 1, and the area where the reliability is low is the area where the pixel value is 0. However, these areas may be reversed. That is, the area where the reliability is high is the area where the pixel value is 0, and the area where the reliability is low is the area where the pixel value is 1. In this case, when a weight image is generated, the pixel values of the reliability image are inverted, whereby it is possible to set a high weight in the area where the reliability is high, and set a low weight in the area where the reliability is low. In this case, a dilation process is performed instead of the erosion process in the fourth exemplary embodiment on the reliability image. The value of a pixel of interest at the center of the kernel is the maximum value of the pixels in the kernel. Consequently, it is possible to dilate the low reliability area before the blurring process and prevent an increase in the weight of the low reliability area.

Figure 10:
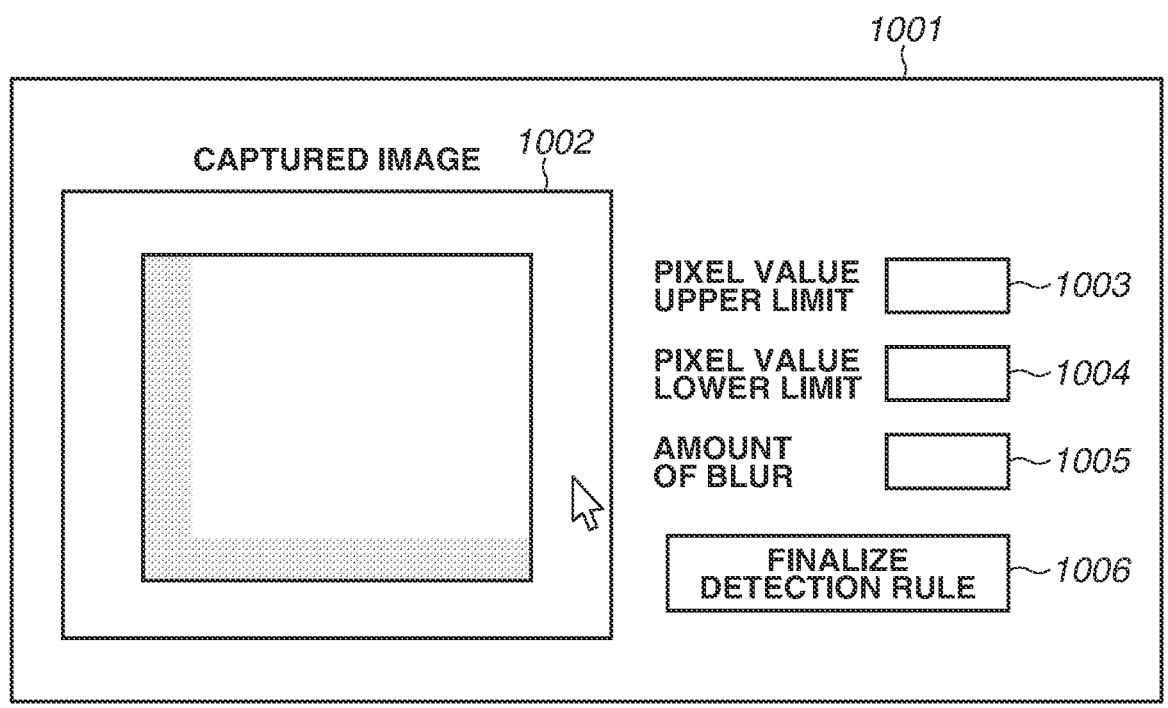
FIG. 10 is a schematic diagram illustrating an example of a user interface.

The image processing apparatus 100 according to each of the above exemplary embodiments may further include a display control unit that displays on the display 115 a GUI that enables the user to confirm the detected low reliability area. FIG. 10 is a schematic diagram illustrating an example of the GUI for the user to confirm the low reliability area. In a window 1001, the user can specify the detection result and the detection parameters of the low reliability area. The captured object and the detected low reliability area (a gray area) are displayed in an image display area 1002. The user can specify thresholds for the low reliability area through a "pixel value upper limit" input box 1003 and a "pixel value lower limit" input box 1004. A numerical value input to the "pixel value upper limit" input box 1003 corresponds to the threshold $Th_1$, and a numerical value input to the "pixel value lower limit" input box 1004 corresponds to the threshold $Th_2$. The low reliability area in the image display area 1002 is updated based on the specified thresholds. The user can specify the kernel width of the blur filter through an "amount of blur" input box 1005. The user can finalize the input parameters by pressing a "finalize detection rule" button 1006.

In a case where either of $I(x, y, m) < Th_1$ or $I(x, y, m) > Th_2$ is satisfied, the setting unit 122 according to each of the above exemplary embodiments determines that the pixel of interest is a pixel in the low reliability area. Alternatively, the determination may be made using only a single threshold. For example, it may only be determined whether $I(x, y, m) < Th_1$ is satisfied, or it may only be determined whether $I(x, y, m) > Th_2$ is satisfied.

According to the present disclosure, it is possible to derive normal information regarding an object with high accuracy even in a case where a shadow or specularly reflected light unexpectedly appears in a captured image.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2022-112009, filed Jul. 12, 2022, and No. 2023-073848, filed Apr. 27, 2023, which are hereby incorporated by reference herein in their entirety.

What is claimed is:

1. An image processing apparatus comprising:
a processor; and
a memory in communication with the processor, the memory storing instructions that, when executed by the processor, cause the processor to:
acquire image data obtained by capturing an image of an object to which light is emitted from a plurality of lighting units;
set a first area with a low reliability for deriving normal information regarding the object in an image represented by the acquired image data;
derive a weight for deriving the normal information regarding the object so that the weight continuously changes between the first area and a second area different from the first area; and
derive the normal information regarding the object based on the derived weight,
wherein the weight is derived by performing a process of dilating the first area and a blurring process.

2. The image processing apparatus according to claim 1, wherein the weight is derived so that a weight corresponding to the first area is smaller than a weight corresponding to the second area.

3. The image processing apparatus according to claim 1, wherein in a case where a pixel value of a pixel of interest in the image is smaller than a first threshold, the pixel of interest is set in the first area.

4. The image processing apparatus according to claim 1, wherein in a case where a pixel value of a pixel of interest in the image is greater than a second threshold, the pixel of interest is set in the first area.

5. The image processing apparatus according to claim 1, wherein in a case where a pixel value of a pixel of interest in the image is smaller than a first threshold or greater than a second threshold, the pixel of interest is set in the first area.

6. The image processing apparatus according to claim 1, wherein the weight is derived by performing a blurring process.

7. The image processing apparatus according to claim 1, wherein the processor is further configured to detect an edge in the image represented by the acquired image data, wherein the weight is derived based on the detected edge.

8. The image processing apparatus according to claim 1, wherein a number of the plurality of lighting units is three or more.

9. The image processing apparatus according to claim 1, wherein the processor is further configured to display on a display a user interface for a user to confirm the first area.

10. An image processing method comprising:
   acquiring image data obtained by capturing an image of an object to which light is emitted from a plurality of lighting units;
   setting a first area with a low reliability for deriving normal information regarding the object in an image represented by the acquired image data;
   deriving a weight for deriving the normal information regarding the object so that the weight continuously changes between the first area and a second area different from the first area; and
   deriving the normal information regarding the object based on the derived weight,
   wherein the weight is derived by performing a process of dilating the first area and a blurring process.

11. A non-transitory computer-readable storage medium storing instructions that, when executed by a computer, cause the computer to perform an image processing method, the image processing method comprising:
   acquiring image data obtained by capturing an image of an object to which light is emitted from a plurality of lighting units;
   setting a first area with a low reliability for deriving normal information regarding the object in an image represented by the acquired image data;
   deriving a weight for deriving the normal information regarding the object so that the weight continuously changes between the first area and a second area different from the first area; and
   deriving the normal information regarding the object based on the derived weight,
   wherein the weight is derived by performing a process of dilating the first area and a blurring process.

* * * * *